United States Patent
Lange et al.

(10) Patent No.: US 6,351,757 B1
(45) Date of Patent: Feb. 26, 2002

(54) METHOD FOR CONSERVING MEMORY STORAGE DURING AN INTERPOLATION OPERATION

(75) Inventors: Eric W. Lange, Campbell; Stephen Hoge, Santa Cruz, both of CA (US)

(73) Assignee: Creative Technology Ltd., Singapore (SG)

(*) Notice: Subject to any disclaimer, the term of this patent is extended or adjusted under 35 U.S.C. 154(b) by 0 days.

(21) Appl. No.: 09/192,044

(22) Filed: Nov. 13, 1998

(51) Int. Cl.[7] .............................................. G06F 17/17
(52) U.S. Cl. ...................................... 708/290; 712/221
(58) Field of Search ........................... 708/290; 712/221

(56) References Cited

U.S. PATENT DOCUMENTS

| | | | |
|---|---|---|---|
| 3,748,447 A | * 7/1973 | Hajicek et al. | ............. 708/290 |
| 5,075,880 A | * 12/1991 | Moses et al. | ................ 708/290 |
| 5,862,063 A | * 1/1999 | Thome et al. | .............. 708/290 |
| 5,920,494 A | * 7/1999 | Setbacken et al. | .......... 708/290 |

* cited by examiner

Primary Examiner—David H. Malzahn
(74) Attorney, Agent, or Firm—Townsend and Townsend and Crew LLP

(57) ABSTRACT

A method for conserving memory storage during the execution of a interpolation operation uses a pool of interpolation commands. When a interpolation operation is requested, it is performed using one of the pooled interpolation commands. If none of the pooled interpolation commands are available, the interpolation command having the smallest difference between its interpolated value and final value is selected, and its interpolated value converted to its final value. The selected interpolation command is then reassigned to interpolate the requested data.

20 Claims, 2 Drawing Sheets

METHOD FOR CONSERVING MEMORY STORAGE DURING AN INTERPOLATION OPERATION

CROSS REFERENCE TO RELATED APPLICATIONS

The commonly owned, patent application entitled: "Processor with Instruction Set for Audio Effects," U.S. patent application Ser. No. 08/886,920, filed Jul. 2, 1997, now U.S. Pat. No. 5,930,158, issued Jul. 27, 1999, is herein incorporated by reference.

COPYRIGHT NOTICE

A portion of the disclosure of this patent document contains a computer program listing which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates generally to a method for conserving memory space during program execution and more specifically to a method for conserving memory storage within an audio signal processor during an interpolation operation.

Interpolation programs and subroutines are known in the art for providing a gradual transition between two distinct data values, for instance, from a low setting to a high setting. It can be understood that if the difference between the two data values is too great, an instantaneous conversion of the low setting to the high setting results in signal distortion. The interpolation process allows the transition to be made gradually, and by so doing minimizes the signal distortion which may otherwise result from the transition.

Audio signal processors often require interpolation operations to vary the characteristics of audio information. Interpolation may be required between two widely varying values to generate special effects, or to ensure high quality audio performance. If the difference between the two levels is large and changed instantaneously (a process which is referred to as "slamming"), undesirable sound effects such as "pops" or "clicks" can result. Interpolation allows the levels to be changed from one value to the other gradually, thereby reducing or eliminating the occurrence of signal distortion and the unwanted audio effects.

A downside of implementing an interpolation process is that it typically requires additional memory space to store the interpolation commands and additional data needed to perform the interpolation process. Audio processors, as most other signal processors, have limited memory resources. It is therefore desirable to reduce the memory space needed during implementation of interpolation operations while reducing the occurrences of the aforementioned "slamming" effects.

SUMMARY OF THE INVENTION

The present invention provides a method for conserving memory storage during the execution of a interpolation operation while simultaneously reducing the occurrence of signal distortion. The method is accomplished in one embodiment using a pool of interpolation commands. When a interpolation operation is requested, it is performed using one of the pooled interpolation commands. If none of the pooled interpolation commands are available, for instance when all are simultaneously active, the interpolation command having the smallest difference between its interpolated value and final value is selected, and its interpolated value converted to its final value. By identifying and converting the data value which is closest to its final value, the aforementioned slamming effects are reduced. The selected interpolation command is then reassigned to interpolate the requested data. The reuse of the pooled interpolation commands saves memory space since an existing command or routine is used to carry out the requested interpolation. The need to allocate memory space to another interpolation command or routine is averted.

The invention will be better understood when considered in light of the following drawings and detailed description.

DESCRIPTION OF THE SPECIFIC EMBODIMENTS

An instruction which allows coefficient values to be modified in a controlled fashion is the INTERP instruction, the description and operation of which has been set forth in the above-referenced co-pending patent application entitled: "Processor with Instruction Set for Audio Effects." The INTERP instruction accomplishes this by calculating a scaled linear interpolation between an two values A and Y, at a specific rate X, using the arithmetic operation shown in equation 1:

$$A - X(A-Y) \rightarrow R \quad (1)$$

Accordingly, an initial value A is transformed to a final value Y at a scaling rate of X. R represents the interpolated value of A after one interpolation iteration. If R is substituted for A and equation (1) repeated, R becomes a further interpolated value of A, approaching the final value Y. The scaling value X controls the incremental change during each interpolation step. The process may require one or more iterations to complete the interpolation, depending up the scaling value X selected and the difference between the initial and final values A and Y, respectively. In its preferred embodiment, the INTERP instruction requires four memory registers for execution: one register for the INTERP instruction and one register each for storage of the initial, final, and scaling values A, Y, and X, respectively.

Figure 1:
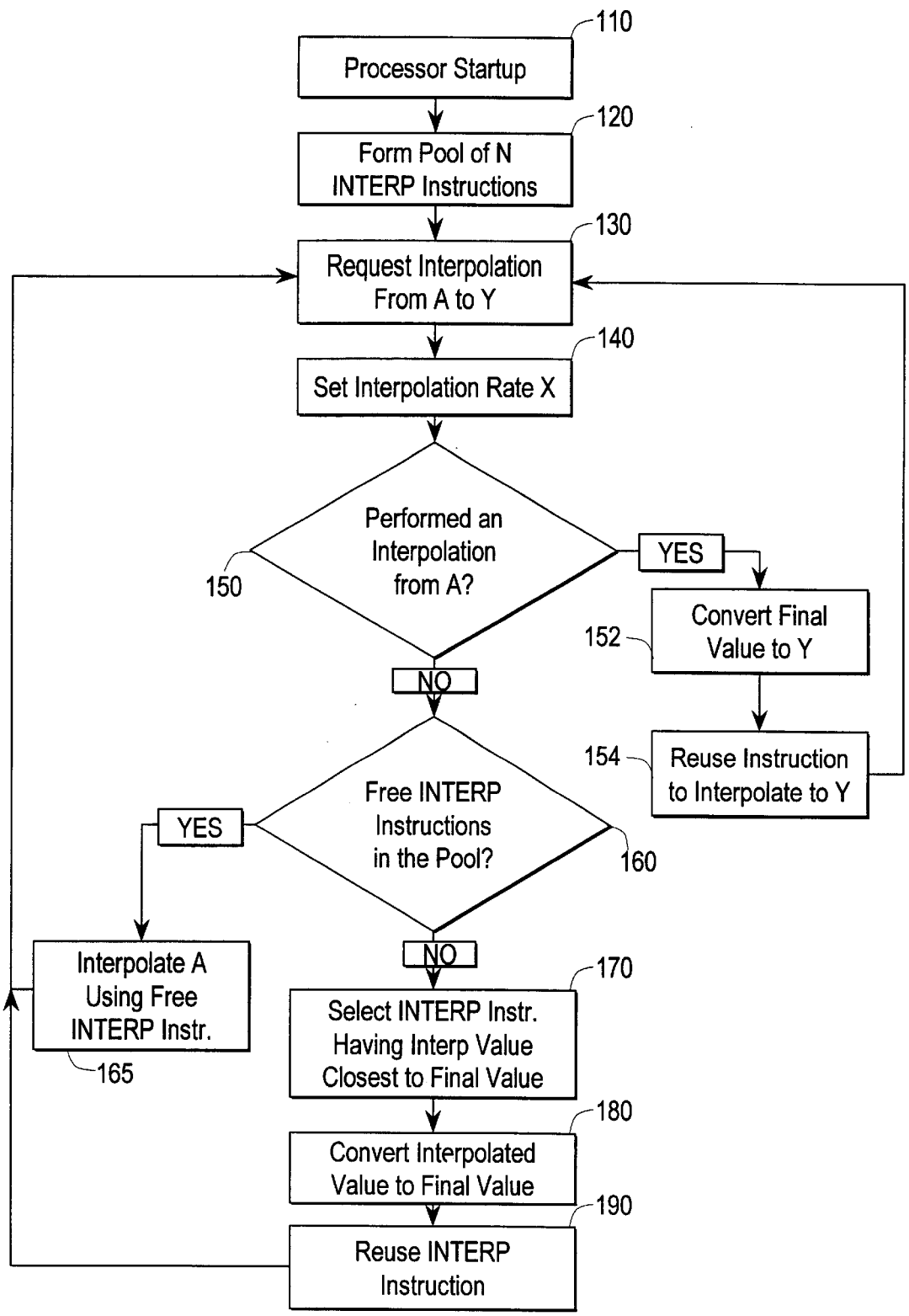
FIG. 1 illustrates a method for reducing memory storage during the execution of an interpolation operation in accordance with the present invention.

FIG. 1 illustrates a method for reducing memory storage during the execution of the interpolation operation. The method is applicable to the aforementioned INTERP instruction as well as other commands, routines, and processes which perform an interpolation operation from an initial value to a final value.

The method begins upon processor startup, at which time N INTERP instructions are pooled and stored into memory (step 120). The size of the pool is determined by such factors as the expected number of simultaneously occurring interpolation operations and the amount of memory allocated to interpolation operations. Other factors may include (but are not limited to) knowledge about previous interpolation loads and the processor's total available memory space. In the audio signal processor described in the co-pending patent application, "Processor with Instruction Set for Audio Effects," N is between 3 and 8 instructions and each instruction is stored within an instruction memory register. In an alternative embodiment, the number of instructions allocated to the pool is dynamic and changes over time in response to light or heavy periods of simultaneously requested interpolation operations.

In the preferred embodiment, step 120 is executed using the following C source code, although other programming languages and/or instructions executing similar operations could be used to perform the same step.

```
        /* If interpolators are being requested . . . */
        if( nInterpolators > 0) {
            /* Grab the first consecutive nInterpolators*2 general
             * GPRs and stuff the chipID in the gprAlloc[ ] array.
             */
#if VARIABLE_RAMPER
            for( j=0, i = pChipInfo->addrGeneral; j < nInterpolators*2;
                    ++j, ++i) {
#else
            for( j=0, i = pChipInfo->addrGeneral; j < nInterpolators;
                    ++j, ++i) {
#endif
                pChipInfo->gprAlloc(i) = chipID;
            }
            /* Grab nInterpolators consecutive instructions */
            status = allocMap( &(pChipInfo->instrLoc),
                        nInterpolators,
                        INTERPOLATORID,
                        (FXID) chipID,
                        & (pChipInfo->interpLoc) );
            if( status != FXERROR_NO_ERROR) {
                OS_RELEASEMUTEX(fx8210Mutex);
                return status;
            }
            status = fxParamAllocInterpolators( & (pChipInfo->interpolatorID),
                    nInterpolators,    pChipInfo->addrGeneral,
                    (ADDR) memMap[pChipInfo->interpLoc].ulAddr );
            if( status != FXERROR_NO_ERROR ) {
                OS_RELEASEMUTEX(fx8210Mutex);
                return status;
            }
        }
/************************************************************************
*
* @doc SUPERUSER
* @func FXSTATUS | fxParamAllocInterpolators |
*
* This function allocates <p nInterpolators> rampers for use by a chip.
*
* @parm FXID *  | interpolatorID| Specifies output buffer for opaque interpolator FXID.
* @parm int     | nInterpolators| Specifies number of rampers to allocate.
* @parm ADDR    | gprAddr       | Specifies physical address of first consecutive general GPR.
* @parm ADDR    | instrAddr     | Specifies physical address of first consecutive instruction.
*
* @comm This is not a user-level function. It is called by the
* resource manager to set up the ramper data structures. Each ramper
* reserves one instruction and two GPRs, and it is assumed that these
* consecutive addresses have already been reserved for this purpose.
*
* @rdesc This function returns one of the following:
* @flag FXERROR_ND_ERROR            | If successful.
* @flag FXERROR_OUT_OF_MEMORY        |    If not enough memory to complete operation.
*
* @xref <f fxParamFreeInterpolators>
*
************************************************************************
*/
FXSTATUS
fxParamAllocInterpolators( FXID *interpolatorID, int nInterpolators, ADDR gprAddr,
                            ADDR instrAddr
{
    FXINTERPOLATOR *pPtr, *pInterp, *pTemp;
#if FX_DYNAMIC
    int i;
#endif
    if( !nInterpolators ) return FXERROR_NO_ERROR;
    /*Count out n interpolators */
#if !FX_DYNAMIC
    for( pPtr = pFreeInterpolators; pPtr && nInterpolators--;
            pPtr = pPtr->pChain ){
```

-continued

```
        pPtr->inUse      = FALSE;
        pPtr->instrAddr = instrAddr++;
#if VARIABLE_RAMPER
        pPtr->addrGPRx = gprAddr++;
#endif
        pPtr->eddrGPRy = gprAddr++;
        pTemp = pPtr;
    }
    if( !pPtr ) return FXERROR_OUT_OF_MEMORY;
    pInterp = pFreeInterpolators;
    pFreeInterpolators = pPtr; /*was ->pChain */
    pTemp->pChain = NULL;
#else
    }
    FXINTERPOLATOR *newblock,
        newblock = (FXINTERPOLATOR *)
            OS_MALLOC( sizeof( FXINTERPOLATOR ) * nInterpolators );
        if( !newblock) {
            OS_RELEASEMUTEX(fx8210Mutex);
            return FXERROR_OUT_OF_MEMORY;
        }
        for( i=0; i<nInterpolators; i++ ) {
            newblock[i].inUse      = FALSE;
            newblock[i].instrAddr = instrAddr++;
#if VARIABLE_RAMPER
            newblock[i].addrGPRx   = gprAddr++;
#endif
            newblock[i].addrGPRy   = gprAddr++;
            newblock[i].pChain     = &(newblock[i+1]);
        }
        newblock[i-1].pChain = NULL;
        pInterp = &(newblock[0]);
    }
#endif
    *interpolatorID = INT2ID(pInterp);
    return FXERROR_NO_ERROR;
}
```

Subsequently at step 130, the program requests an interpolation operation from an initial value A to a final value Y. Interpolation requests may occur any time after processor start up, for instance, immediately following start up or after a number of intervening programming steps (not shown).

Step 130 is executed using the following C source code in the preferred embodiment, although other programming languages and/or instructions executing similar operations could be used to perform the same step.

```
* @doc APPLET
* @func FXSTATUS | fxParamInterpolate |
*
* This function sets an interpolator to ramp the
* given GPR to <p ulValue> at rate <p fxRate>.
*
* @parm FXPGMID         | pgmID      | Specifies program ID.
* @parm OPERAND         | gprAddr    | Specifies GPR to ramp.
* @parm ULONG    | ulDest      | Specifies destination GPR value.
* @parm FXRATE   | fxRate      | Specifies time constant.
*
* @comm The interpolator will continue to ramp the GPR until one of
* the following conditions is met: (1) the program is shut down;
* (2) a call is made to <f fxPgmStopInterpolator( )>; (3) a call is made
* to <f fxPgmStopAllInterpolators( )>; or, (4) it is reallocated to
* another program or GPR. So, when a value reaches its
* destination, it cannot be assumed that the interpolator has gone
* away. If the value of the GPR is modified externally and the
* interpolator is still allocated, it will continue to ramp its value.
* It can also not be assumed that the value will always reach
* <p ulDest> exactly. Furthermore, <p fxRate> is approximate, and
* there is no guarantee that the interpolator will not get reallocated
* before the GPR reaches its destination value. In this case, the
* GPR will be forced to <p ulDest> before reallocation.
*
* @rdesc This function returns one of the following:
* @flag FXERROR_NO_ERROR               | If successful.
* @flag FXERROR_INVALID_ID              | If <p pgmID> is not valid.
```

-continued

```
* @flag FXERROR_INVALID_GPR          | If <p gprAddr> is not valid.
*
* @xref <t OPERAND><t FXRATE><f fxPgmStopInterpolator>
*        <f fxPgmStopAllInterpolators>
*
******************************************************************
*/
FXSTATUS EMUAPIEXPORT
fxParamInterpolate( FXPGMID pgmID, OPERAND gprAddress, ULONG ulDest
#if VARIABLE_RAMPER
          , FXRATE fxRate
#endif
)
{
    FXINTERPOLATOR *pHead, *pPtr, *pClosest = NULL;
    ULONG ulDif, ulComp = 0xffffffff, ulChipHandle;
    ULONG ulUCL, ulUCH;
    if( !fxPgmValidPgmID((FXID)pgmID) ) return FXERROR_INVALID_ID;
    OS_WAITMUTEX(fx8210Mutex);
    pHead = ID2INT( fxRsrcGetInterpolatorID( fxPgmGetRsrcID((FXID)pgmID) ) );
    ulChipHandle = fxPgmGetChipHandle( (FXID)pgmID );
    if( !pHead ){
         OS_RELEASEMUTEX(fx8210Mutex);
         return FXERROR_NO_INTERPOLATORS;
    }
    /* translate to physical GPR */
    if( gprAddress & (~VIRTMASK) )
         gprAddress = fxPgmMapVirtualToPhysicalGPR ( (FXID)pgmID,
    (ADDR) (gprAddress&VIRTMASK));
```

After the request is made, an interpolation value X is selected for the interpolation operation (step 140). In the preferred embodiment, the interpolation value remains constant for all interpolation iterations, although in an alternative embodiment, the interpolation rate may vary over one or more iterations.

This selection of the interpolation value (step 140) may also include providing either a single interpolation value to all pooled instructions or separate values to separate instructions. When a single value is used, additional memory registers can be conserved since only one (instead of N) memory register(s) is needed to supply N pooled instructions. If separate values of X are used, additional processing flexibility is achieved. The interpolation value may be held constant or made variable over the entire pool or within instruction subgroups of the pool.

Next at step 150, an inquiry is made as to whether any of the INTERP instructions have performed a previous operation from the initial value A, i.e., if a previous interpolation has begun from initial value A. This could be the case, for instance, if A has been interpolated to different final value Z. In the preferred embodiment, the immediately preceding operation is queried, although in an alternative embodiment more distant operations may be queried as well. Step 150 is executed using the following C source code in the preferred embodiment, although other programming languages and/or instructions executing similar opeartions could be used to perform the same step.

```
/* if GPR already being ramped, use this one */
for( pPtr=pHead; pPtr; pPtr=pPtr->pChain ) {
```

If the answer to step 150 is yes, the final value Z of the previously used INTERP instruction is converted to Y (step 152). Upon the conversion of Z to Y (and selection of a interpolation value X), the INTERP instruction is reused to perform the requested interpolation operation (step 154). Once the operation is completed, the program counter returns to step 130 to await another interpolation request. The reuse of the INTERP instruction saves at least one memory register since a new INTERP instruction (and accordingly a new memory register) would otherwise be necessary to perform the new interpolation operation. In the preferred embodiment, steps 152 and 154 are executed using the following C source code, although other programming languages and/or instructions executing similar operations could be used to perform the same step.

```
if( pPtr->inUse && pPtr->gpr==gprAddress ) {
    OS_WRITEGPR( ulChipHandle, pPtr->addrGPRy,
       ulDest );
    pPtr->ulDest=ulDest;
    OS_RELEASEMUTEX(fx8210Mutex);
    return FXERROR_NO_ERROR;
)
)
```

If the answer to step 150 is no, the method inquires if there are any free INTERP instructions within the pool, i.e., are there any INTERP instructions which are not concurrently interpolating any values (step 160). If there are, a free INTERP instruction is assigned the initial, final, and interpolation values A, Y, and X respectively, and that instruction begins the interpolation operation (step 165). Once the operation is completed, the program counter returns to step 130 to await another interpolation request. As explained above, this operation saves at least one memory register since an existing INTERP instruction is used to carry out the requested interpolation. In the preferred embodiment, steps 160 and 165 are executed using the following C source code sections, respectively, although other programming languages and/or instructions executing similar operations could be used to perform the same step.

Step 160

```
/* find unused interpolator */
for( pPtr = pHead; pPtr && pPtr->inUse; pPtr = pPtr->pChain ){
    ulDif = OS_READGPR( ulChipHandle, pPtr->gpr );
    if( pPtr->gpr > LAST_GENERALGPR ) ulDif <<=
```

-continued

```
    TRAMADJSHIFT;
    ulDif = (ulDif > pPtr->ulDest) ? ulDif - pPtr->ulDest :
            pPtr->ulDest - ulDif;
    if( ulDif < ulComp ){
        ulComp = ulDif;
        pClosest = pPtr;
    }
}
/* all interpolators are in use, use whichever one is closest to
 * its destination
 */
if ( !pPtr ) {
```

Step 165

```
/* Load new values into X and Y
    #if VARIABLE_RAMPER
        OS_WRITEGPR( ulChipHandle, pPtr->addrGPRx, fxRate );
    #endif
        OS_WRITEGPR( ulChipHandle, pPtr->addrGPRy, ulDest );
        /* write instruction */
        OS_WRITEINSTRUCTION ( ulChipHandle, pPtr->instrAddr,
                              ulUCL, ulUCH );
```

If the answer to step 160 is no, a search is performed to select the INTERP instruction having an interpolated value which is closest to its final value. (step 170). The interpolated value of the selected INTERP instruction is converted to its final value (step 180). The selected INTERP instruction is then reassigned to perform the requested interpolation from the initial value A towards a final value Y at the selected rate X (step 190). Once the operation is completed, the program counter returns to step 130 to await another interpolation request.

The reuse of an existing INTERP instruction saves at least one memory register. Moreover, since the difference between the interpolated and final values is, by definition, the smallest of all of the pooled INTERP instructions, it is very unlikely that a conversion therebetween will result in the "slamming" effects described above. As the number of pooled INTERP instructions increases, the conversion becomes even more transparent, further attenuating the possibility of any "slamming" effects. In the preferred embodiment, steps 170, 180 and 190 are executed using the following C source code sections, respectively, although other programming languages and/or instructions executing similar operations could be used to perform the same step.

Step 170

```
pPtr = pClosest;
if( !pPtr ) {
    OS_RELEASEMUTEX(fx8210Mutex);
    return FXERROR_NO_INTERPOLATORS;
}
} else {
    pClosest = NULL;
}
/* translate to physical GPR */
if( gprAddress & (~VIRTMASK) )
    gprAddress = fxPgmMapVirtualToPhysicalGPR( (FXID)pgmID,
        (ADDR) (gprAddress&VIRTMASK));
/* Generate instruction: INTERP current, rate, dest, current */
fxParamPackInstruction( FXINSTR_INTERP, gprAddress,
#if VARIABLE_RAMPER
                        pPtr->addrGPRx,
```

-continued

```
#else
                        RAMP_CONSTANT,
#endif
                        pPtr->addrGPRy, gprAddress,
                        &ulUCL, &ulUCH );
```

Step 180

```
/* if we took an interpolator already in use, slam its value */
if( pClosest ) {
    if( pPtr->gpr <= LAST_GENERALGPR ) {
        OS_WRITEGPR( ulChipHandle, pPtr->gpr,
            pPtr->ulDest );
    } else {
        DS_WRITEGPR( ulChipHandle, pPtr->gpr,
            (pPtr->ulDest)>>TRAMADJSHIFT
);
    }
}
pPtr->pgmID  = (FXID)pgmID;
pPtr->inUse  = TRUE;
pPtr->gpr    = gprAddress;
pPtr->ulDest = ulDest;
OS_RELEASEMUTEX(fx8210Mutex);
return FXERROR_NO_ERROR;
}
```

Step 190

```
/* Load new values into X and Y
#if VARIABLE_RAMPER
    OS_WRITEGPR( ulChipHandle, pPtr->addrGORx, fxRate );
#endif
    OS_WRITEGPR( ulChipHandle, pPtr->addrGPRy, ulDest );
    /* write instruction */
    OS_WRITEINSTRUCTION ( ulChipHandle, pPtr->instrAddr,
                          ulUCL, ulUCH );
```

In the above described manner, the interpolation process of the present invention uses one less memory register and possibly two less registers if a constant scaling coefficient is used. By pooling and reusing the interpolation commands, 25–50% fewer memory registers are needed, freeing memory storage for other processor operations. Alternatively, a processor employing the described process may be fabricated using a smaller memory array, resulting in a lower cost, higher yield processor.

The described method may be implemented in a multitude of different forms (i.e., software, hardware, or a combination of both) and in a variety of systems to interpolate any type of digital data from an initial value to a final value. In one embodiment, the described method can be implemented as a software program to interpolate audio information in an audio signal processor. In an alternative embodiment, the method may be realized as a software program to interpolate any type of digital data in a computer system.

Figure 2:
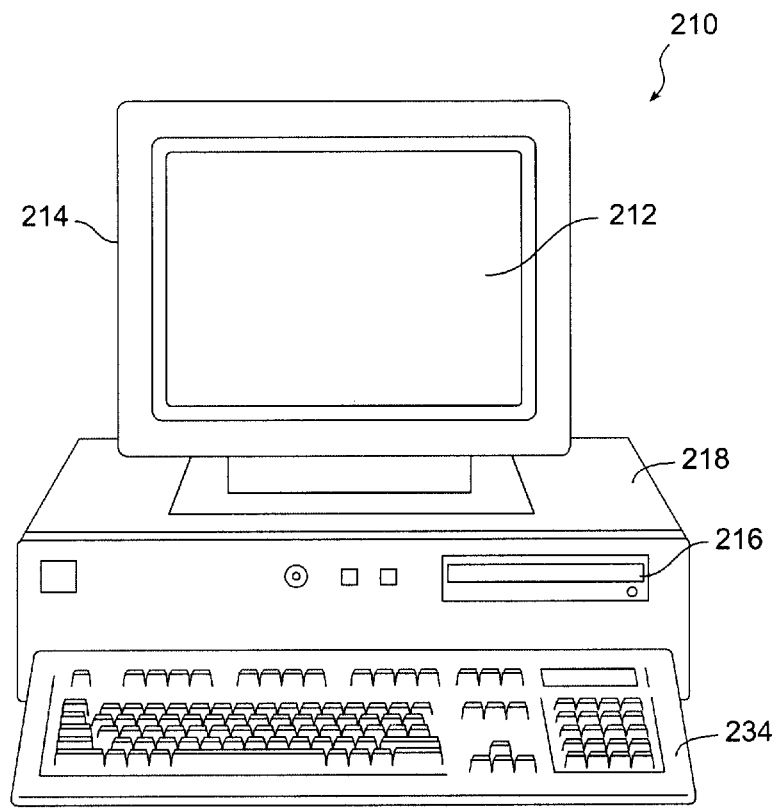
FIG. 2 illustrates an example of a computer system used to perform the method of the present invention.

FIG. 2 illustrates an example of a computer system 210 implementing the described method for conserving memory space during the execution of an interpolation operation. Computer system 210 includes a monitor 214, screen 212, cabinet 218, and keyboard 234. A mouse (not shown) may also be included for providing additional input/output commands. Cabinet 218 houses a CD-ROM drive 216 or a hard drive (not shown) which may be utilized to store and retrieve digital data and software programs incorporating the present method, and the like. Although CD-ROM 216 is shown as the removable media, other removable tangible media including floppy disks, tape, and flash memory may be utilized. Cabinet 218 also houses familiar computer components (not shown) such as a processor, memory, and the like.

Figure 3:
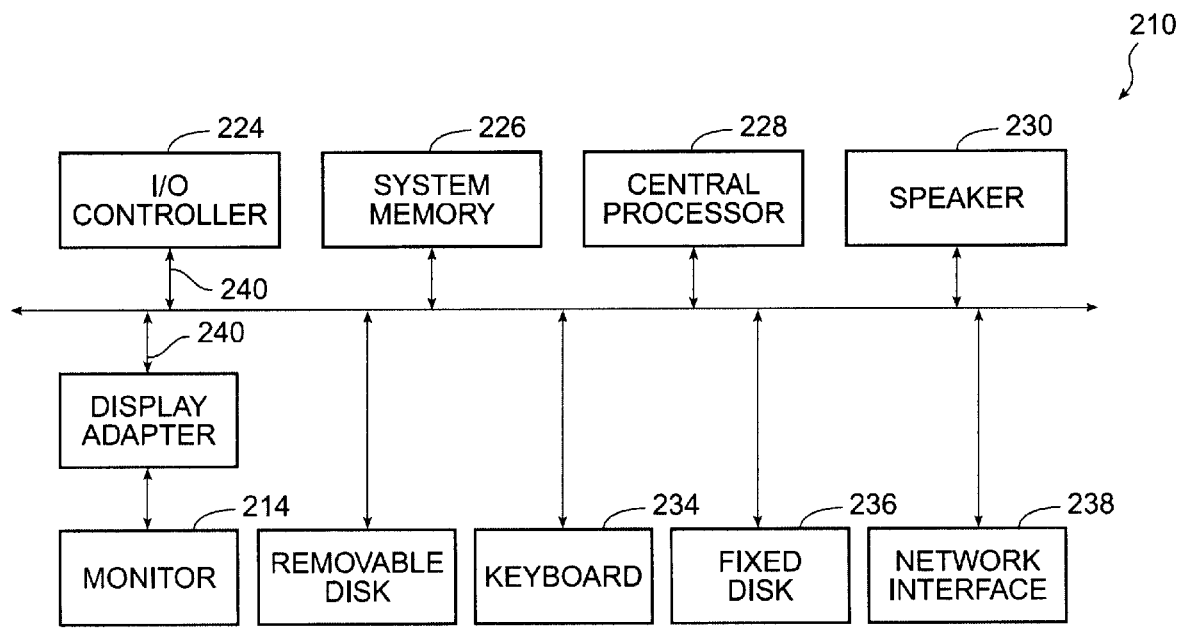
FIG. 3 illustrates a simplified system block diagram of a typical computer system used to perform the method of the present invention.

FIG. 3 illustrates a simplified system block diagram of a typical computer system 210 used to execute a software program incorporating the described method. As shown in FIG. 2, computer system 210 includes monitor 214. Computer system 210 further includes subsystems such as I/O controller 224, system memory 226, central processor 228, speaker 230, removable disk 232, keyboard 234, fixed disk 236, and network interface 238. Other computer systems suitable for use with the described method may include additional or fewer subsystems. For example, another computer system could include more than one processor 228 (i.e., a multi-processor system) for processing the digital data responsive to the aforementioned interpolation method. Arrows such as 240 represent the system bus architecture of computer system 210. However, these arrows 240 are illustrative of any interconnection scheme serving to link the subsystems. For example, a local bus could be utilized to connect the central processor 228 to the system memory 226. Computer system 210 shown in FIG. 3 is but an example of a computer system suitable for use with the present invention. Other configurations of subsystems suitable for use with the present invention will be readily apparent to one of ordinary skill in the art.

While the above is a complete description of one possible embodiment of the invention, various alternatives, modification and equivalents may be used. For instance, a person skilled in the art will appreciate that the foregoing description is not limited to the use of the aforementioned INTERP instruction. The objectives of the invention can also be accomplished by implementing a sub-routine which is designed to perform an interpolation operation. The interpolation sub-routine may be stored and reused in accordance with the manner described herein to conserve memory space. The present invention is equally applicable thereto by making appropriate modifications to the embodiment described above. Nor is the invention limited to the processing of audio information. Those of ordinary skill in the art will appreciate that the invention is equally applicable to any form of data. Therefore, the above description should be viewed as only one embodiment of the present invention, the boundaries of which is appropriately defined by the metes and bounds of the following claims.

What is claimed is:

1. A method for conserving memory storage during the execution of an interpolation operation between an initial value and a final value, the method comprising the acts of:
    storing in memory a plurality of interpolation commands for executing respective interpolation operations;
    requesting a first interpolation operation;
    executing said first interpolation operation using at least one of said plurality of interpolation commands;
    requesting a subsequent interpolation operation from an initial value A to a final value Y; and
    using at least one of said plurality of interpolation commands to perform said subsequent interpolation operation, said act of using including the acts of:
    determining if said first interpolation operation is proceeding from said initial value A using at least one interpolation command, said first interpolation operation having a final value Z; and
    converting said final value Z to said final value Y if said first interpolation operation is proceeding from said initial value A.

2. The method of claim 1, wherein said act of using further comprises the acts of:
    determining if at least one interpolation commands is free to perform said subsequent interpolation operation if said first interpolation operation is not proceeding from said initial value A; and
    executing said subsequent interpolation operation from said initial value A to final value Y using said free interpolation command if at least one of said interpolation commands is free to perform said subsequent interpolation operation.

3. The method of claim 2, wherein said act of using further comprises the acts of:
    identifying, if none of said plurality of interpolation commands are free to perform said subsequent interpolation operation, an interpolation command having a current interpolated value and a final value, the difference of which is the smallest compared to the difference between the interpolated and final values of each of the remaining plurality of interpolation commands;
    converting said interpolated value to said final value to complete said respective interpolation operation;
    reassigning said identified interpolation command to perform said subsequent interpolation from said initial value A to said final value Y.

4. The method of claim 3, wherein said act of requesting a first interpolation operation includes the act of defining a first interpolation value and said act of requesting a subsequent operation includes the act of defining a second interpolation value.

5. The method of claim 4, wherein said acts of requesting said first and subsequent interpolation operations include the act of defining the same interpolation value.

6. The method of claim 4, wherein said plurality of interpolation commands are stored in an instruction memory and wherein said initial, final and interpolation values are stored within a non-instruction memory.

7. The method of claim 6, wherein said plurality of interpolation commands each comprise an INTERP instruction.

8. A software product for controlling a plurality of memory registers and a processor to interpolate an initial value to a final value, the software product comprising:
    a computer readable storage media comprising:
        code that directs said processor to store in said memory registers a plurality of interpolation commands for executing respective interpolation operations;
        code that directs said processor to execute a first interpolation command by using at least one of said stored interpolation commands;
        code that direct said processor to execute a subsequent interpolation operation from an initial value A to a final value Y; and
        code that directs said processor to execute said subsequent interpolation operation using at least one of said stored interpolation commands, said code that directs said processor to execute said subsequent interpolation operation including:
        code that directs said processor to determine if said first interpolation operation began from said initial value A, said first interpolation operation having a final value Z; and
        code that directs said processor to convert said final value Z to said final value Y if said first interpolation operation began from said initial value A.

9. The software product of claim 8, wherein said code that directs said processor to execute said subsequent interpolation operation using at least one of said stored interpolation commands comprises:

code that directs said processor to determine if at least one of said stored interpolation commands is free to perform said subsequent interpolation operation if said first interpolation operation is not proceeding from said initial value A; and code that directs said processor to execute said subsequent interpolation operation from said initial value A to final value Y using said free interpolation command if at least one of said stored interpolation commands is free to perform said subsequent interpolation operation.

10. The software product of claim 9, wherein said code that directs said processor to execute said subsequent interpolation operation using at least one of said stored interpolation commands comprises:

code that directs said processor to identify, if none of said plurality of interpolation commands are free to perform said subsequent interpolation operation, a stored interpolation command having a current interpolated value and a final value, the difference of which is the smallest compared to the difference between the interpolated and final values of each of the remaining stored interpolation commands;

code that directs said processor to convert said interpolated value to said final value to complete said respective interpolation operation;

code to direct said processor to reassign said identified interpolation command to perform said subsequent interpolation from said initial value A to said final value Y.

11. In an audio signal processor for processing audio information, the audio signal processor having memory registers for storing instructions and data, a method for conserving memory registers during the execution of an interpolation operation between a stored initial value and a stored final value, the method comprising the acts of:

storing in a plurality of said memory registers a plurality of interpolation commands for executing respective interpolation operations;

requesting a first interpolation operation;

executing said first interpolation operation using at least one of said plurality of interpolation commands;

requesting a subsequent interpolation operation from an initial value A to a final value Y; and using at least one of said plurality of interpolation commands to perform said subsequent interpolation operation, said act of using including:

determining if said first interpolation operation is proceeding from said initial value A using at least one interpolation command, said first interpolation operation having a final value Z; and converting said final value Z to said final value Y if said first interpolation operation is proceeding from said initial value A.

12. The method of claim 11, wherein said act of using further comprises the acts of:

determining if at least one interpolation commands is free to perform said subsequent interpolation operation if said first interpolation operation is not proceeding from said initial value A; and executing said subsequent interpolation operation from said initial value A to final value Y using said free interpolation command if at least one of said interpolation commands is free to perform said subsequent interpolation operation.

13. The method of claim 12, wherein said act of using further comprises the acts of:

identifying, if none of said plurality of interpolation commands are free to perform said subsequent interpolation operation, an interpolation command having a current interpolated value and a final value, the difference of which is the smallest compared to the difference between the interpolated and final values of each of the remaining plurality of interpolation commands;

converting said interpolated value to said final value to complete said respective interpolation operation;

reassigning said identified interpolation command to perform said subsequent interpolation from said initial value A to said final value Y.

14. A signal processor which conserves memory storage during the execution of an interpolation operation between an initial value and a final value, the signal processor comprising:

means for storing in memory a plurality of interpolation commands for executing respective interpolation operations;

means for requesting a first interpolation operation;

means for executing said interpolation operation using at least one of said plurality of interpolation commands;

means for requesting a subsequent interpolation operation from an initial value A to a final value Y; and means for using at least one of said interpolation commands to perform said subsequent interpolation operation, said means for using including:

means for determining if said first interpolation operation is proceeding from said initial value A using at least one interpolation command, said first interpolation operation having a final value Z; and means for converting said final value Z to said final value Y if said first interpolation operation is proceeding from said initial value A.

15. The signal processor of claim 14, wherein said means for using further comprises:

means for determining if at least one interpolation commands is free to perform said subsequent interpolation operation if said first interpolation operation is not proceeding from said initial value A; and means for executing said subsequent interpolation operation from said initial value A to final value Y using said free interpolation command if at least one of said interpolation commands is free to perform said subsequent interpolation operation.

16. The signal processor of claim 15, wherein said means for using further comprises:

means for identifying, if none of said plurality of interpolation commands are free to perform said subsequent interpolation operation, an interpolation command having a current interpolated value and a final value, the difference of which is the smallest compared to the difference between the interpolated and final values of each of the remaining plurality of interpolation commands;

means for converting said interpolated value to said final value to complete said respective interpolation operation; and means for reassigning said identified interpolation command to perform said subsequent interpolation from said initial value A to said final value Y.

17. The signal processor of claim 16, wherein said means for requesting a first interpolation operation includes the means for defining a first interpolation value and said means for requesting a subsequent operation includes means for defining a second interpolation value.

18. The signal processor of claim 17, wherein said means for requesting said first and subsequent interpolation operations include means for defining the same interpolation value.

19. The signal processor of claim 18, wherein said plurality of interpolation commands are stored in an instruction memory and wherein said initial, final and interpolation values are stored within a non-instruction memory.

20. The signal processor of claim 19, wherein said plurality of interpolation commands each comprise an INTERP instruction.

* * * * *